M. STEWART.
Cooking Stove.
No. 2,188.
Patented July 23, 1841.
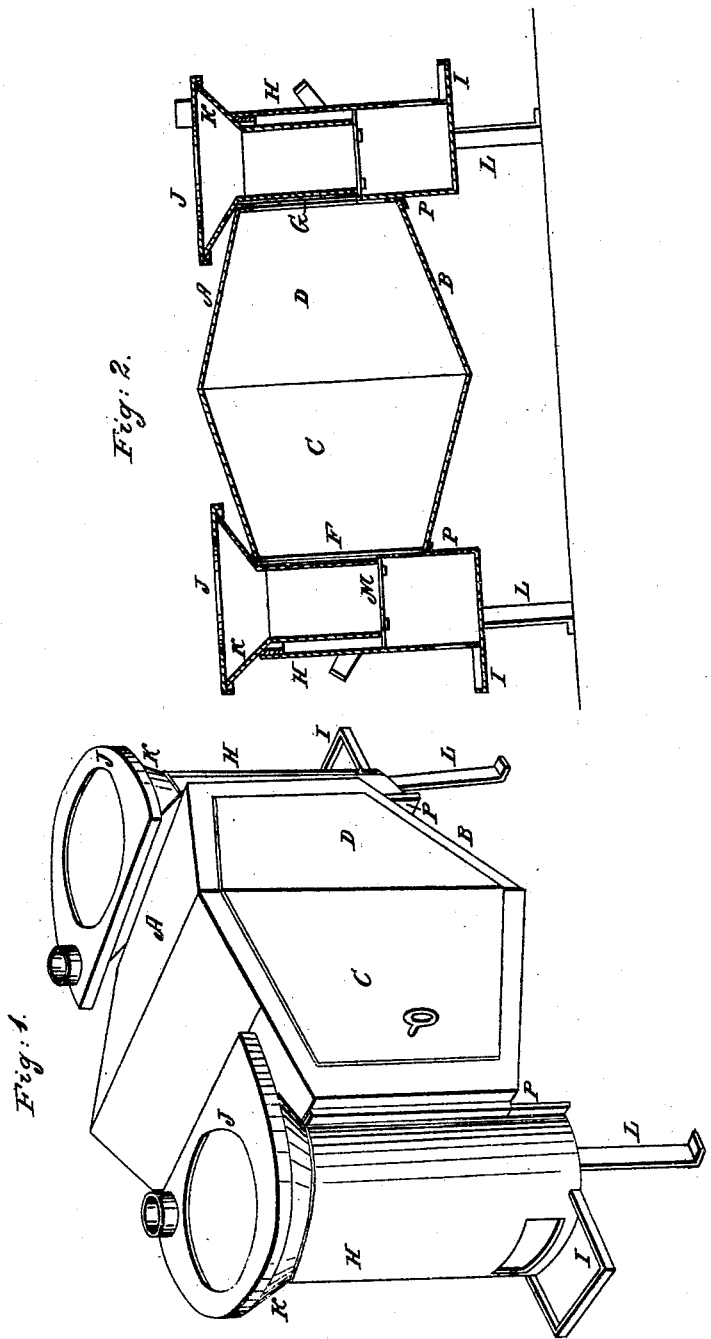

UNITED STATES PATENT OFFICE.

MATHEW STEWART, JR., OF PHILADELPHIA, PENNSYLVANIA.

CONSTRUCTION OF STOVES OR BAKERS FOR COOKING PURPOSES.

Specification of Letters Patent No. 2,188, dated July 23, 1841.

*To all whom it may concern:*

Be it known that I, MATHEW STEWART, Jr., of the city and county of Philadelphia and State of Pennsylvania, have invented a new and useful Cooking-Stove, called the "Franklin Economy Cook-Stove," which is described as follows, reference being had to the annexed drawings of the same, making part of this specification.

Figure 1 is a perspective view of the stove. Fig. 2 is a vertical longitudinal section.

Similar letters refer to corresponding parts.

The nature of my invention and improvement consists principally in the peculiar construction of the oven in combination with two semi circular stoves one at each end for heating it—the top and bottom plates of said oven being placed at an angle of about 12 or 15 degrees with a horizontal plane—while the plates which form the sides are placed at an angle of about 12 or 15 degrees with a vertical plane—the plates which form the ends, through which the heat is admitted, being vertical—thus forming a figure resembling externally two sections of pyramids placed with their bases together—the axis of the pyramids being horizontal—the placing of the plates in this manner being for the purpose of gaining an advantage in the cook stove never before acquired—namely that of radiating and concentrating the heat by means of said inclined plates to the center of the oven, where the article to be cooked is placed, which cooks it in an incredibly short space of time, and with a very small consumption of fuel. And combining with said peculiarly constructed oven the two semi circular stoves, in part, of a novel construction one arranged at each end of the oven—the vertical plates of the oven before mentioned, being the back plates of the chambers of combustion of the stoves, and through which the heat passes into the oven—the top of which stoves being made to flare outward and upward in the manner of a funnel with one side straight and flaring upward over the oven—said flaring part being covered with a horizontal segment cap perforated with a round aperture for cooking or boiling utensils, and another round aperture for the smoke pipe—both stoves being made exactly alike and, susceptible of being used together, when much heat is required, or singly when little heat is required, with more or less fuel as desired, rendered portable by means of handles fixed on the convex surfaces of the stoves by which the apparatus may be removed from place to place, in or out of doors, if desired—the connection of the oven and stoves being effected by letting the edges of the back plates of the stoves into grooves formed on the ends of the oven and resting the ends of the oven upon horizontal flanges on said back plates of the oven.

The plates A B which form the top and bottom of the oven are about 18 inches wide at their greatest width and about 20 inches long and about 13 inches wide at the ends, bent so as to conform to the shape of the sides and produce the angles before mentioned for radiating the heat to the center of the interior—the side plates C D are the same length, but they are narrower at the ends being only 11 inches wide, and 18 inches wide in the center where they are bent to correspond with the top and bottom plates. An opening is left in one side to admit the article to be cooked closed by the hinged door E of corresponding shape to the side of the oven. The vertical end plates F, G, (which are the back plates of the fire chambers) are about 9½ inches square. The diameter of each stove H should be about 10 inches—the height 18 inches, measuring from the bottom of the ash box I to the top of the cap J;—which cap is about 2 inches deep and 12 inches diameter. The sides K of the cap are made flaring outward or funnel shaped. The length of the legs L should be about 8 inches. The grate M is made of cast iron of a semi-circular shape and rests upon ledges fastened to the inside of the stove—the middle bar of which being made movable to clear out the chamber of combustion: this chamber should be lined around its semi circular part with fire clay or brick—the back or straight part F being a cast iron plate. The back plate P of the stove is as long as the stove is high and ten inches wide, perforated with a square opening which is closed by the aforesaid vertical square plate F which forms the back of the chamber of combustion and the end of the oven. The material used for the stoves is generally sheet iron, and for the oven tin, although other materials may be used. And the proportions and dimensions may be varied to suit the views of the constructor. The above named materials and size, however, are found very convenient for the construction of a cheap portable family summer cook stove for the saving of fuel and time for which this stove is admirably adapted.

The fuel proposed to be generally used in this stove is the anthracite coal, although other kinds of fuel may be used. No claim is made to the combination of an oven with a furnace or heater at each end of it; but what is claimed and desired to be secured by Letters Patent is—

The peculiar construction of the heat reflecting oven as described in combination with the two semi circular stoves with funnel shaped caps for saving fuel and cooking expeditiously, as before described.

MATHEW STEWART, Jr.

Witnesses:
  Wm. P. Elliot,
  E. Maher.